United States Patent
Li et al.

(10) Patent No.: US 10,152,117 B2
(45) Date of Patent: Dec. 11, 2018

(54) CONTEXT DEPENDENT REACTIONS DERIVED FROM OBSERVED HUMAN RESPONSES

(71) Applicant: Intel Corporation, Santa Clara, CA (US)

(72) Inventors: Hong Li, El Dorado Hills, CA (US); Rita H. Wouhaybi, Portland, OR (US); Igor Tatourian, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 306 days.

(21) Appl. No.: 14/454,375

(22) Filed: Aug. 7, 2014

(65) Prior Publication Data

US 2016/0039097 A1 Feb. 11, 2016

(51) Int. Cl.
    *G06F 3/01* (2006.01)
    *B25J 11/00* (2006.01)
    *B25J 9/16* (2006.01)

(52) U.S. Cl.
    CPC ............. *G06F 3/011* (2013.01); *B25J 9/1679* (2013.01); *B25J 11/0005* (2013.01); *G05B 2219/39219* (2013.01); *G05B 2219/40026* (2013.01)

(58) Field of Classification Search
    CPC ............... B25J 11/0005; B25J 9/1679; G05B 2219/40026; G05B 2219/39219; G06F 3/011
    USPC ................................ 700/245, 246; 901/1, 47
    See application file for complete search history.

(56) References Cited

U.S. PATENT DOCUMENTS

| | | | | |
|---|---|---|---|---|
| 2002/0120362 A1* | 8/2002 | Lathan | ............ | A63F 13/00 700/245 |
| 2003/0060930 A1* | 3/2003 | Fujita | ............ | B25J 9/1602 700/245 |
| 2006/0293787 A1* | 12/2006 | Kanda | ............ | G06N 3/008 700/245 |
| 2007/0146371 A1* | 6/2007 | Dariush | ............ | B25J 9/1602 345/474 |

(Continued)

FOREIGN PATENT DOCUMENTS

JP 2004227276 A2 * 8/2004

OTHER PUBLICATIONS

English Translation of referenceJP2004227276A.*
JP2004227276A Human_Translation, Aug. 2004.*

*Primary Examiner* — Rachid Bendidi
(74) *Attorney, Agent, or Firm* — Schwabe, Williamson & Wyatt, P.C.

(57) ABSTRACT

Computer-readable storage media, apparatuses, and methods associated with context dependent reactions derived from human responses are disclosed herein. An apparatus may, in some embodiments, include a communication module and a reaction agent. The reaction agent may be configured to transmit, via the communication module, a request to a remote data source. The request may include context data indicative of an operational context of the apparatus. The reaction agent may receive, in response to the request, via the communication module, reaction data for the apparatus to react to the operational context. In embodiments, the reaction data may be derived from previous observations of human response to a context similar to the operational context indicated by the context data of the request. Other embodiments may be described and/or claimed herein.

23 Claims, 5 Drawing Sheets

(56) References Cited

U.S. PATENT DOCUMENTS

| | | | |
|---|---|---|---|
| 2009/0132088 A1* | 5/2009 | Taitler | G05B 19/42 |
| | | | 700/264 |
| 2009/0326710 A1* | 12/2009 | Iba | B25J 5/00 |
| | | | 700/246 |
| 2011/0001813 A1* | 1/2011 | Kim | G06K 9/00355 |
| | | | 348/77 |
| 2011/0118870 A1* | 5/2011 | Sugihara | A63H 11/20 |
| | | | 700/245 |
| 2011/0160908 A1* | 6/2011 | Iba | B25J 9/1679 |
| | | | 700/262 |
| 2012/0078416 A1* | 3/2012 | Iba | B62D 57/032 |
| | | | 700/246 |
| 2012/0239196 A1* | 9/2012 | Olivier, III | B25J 9/1689 |
| | | | 700/259 |
| 2013/0078600 A1* | 3/2013 | Fischer | G09B 19/00 |
| | | | 434/236 |
| 2013/0158707 A1* | 6/2013 | Lee | G06N 5/02 |
| | | | 700/246 |
| 2013/0211587 A1* | 8/2013 | Stephens, Jr. | B25J 9/1689 |
| | | | 700/246 |
| 2014/0350883 A1* | 11/2014 | Carter | A61B 5/6802 |
| | | | 702/141 |
| 2017/0043478 A1* | 2/2017 | Blakely | B25J 9/1605 |

* cited by examiner

CONTEXT DEPENDENT REACTIONS DERIVED FROM OBSERVED HUMAN RESPONSES

TECHNICAL FIELD

Embodiments of the present disclosure are related to the field of data processing, and in particular, to context dependent reactions derived from human responses.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Today's virtual assistants or robots function using pre-programmed instructions, are remotely controlled by a computer, or a combination of both. Despite the fact that algorithms created to make robots behave more like humans have been proposed and developed for decades, robots are still far from having an adaptive personality that is convincing as human behavior. In fact, most robots are capable of replicating only a handful of personalities that are often shallow and predictable.

DETAILED DESCRIPTION OF ILLUSTRATIVE EMBODIMENTS

This disclosure is directed at enabling a computing device, such as a robot or virtual assistant, to respond in various contexts in a more human-like manner. This is enabled by generating reaction data, from observed human responses, correlated with context data to add context to the observed human response. Specific human responses may then be able to be identified and retrieved from a data store by comparing a context in which the computing device is operating with the contexts associated with the observed human responses. This may enable the computing device to adapt to new contexts in a manner more consistent with how a human would react to the new contexts without the need for the computing device to be pre-programmed for the specific situation.

In the following detailed description, reference is made to the accompanying drawings, which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
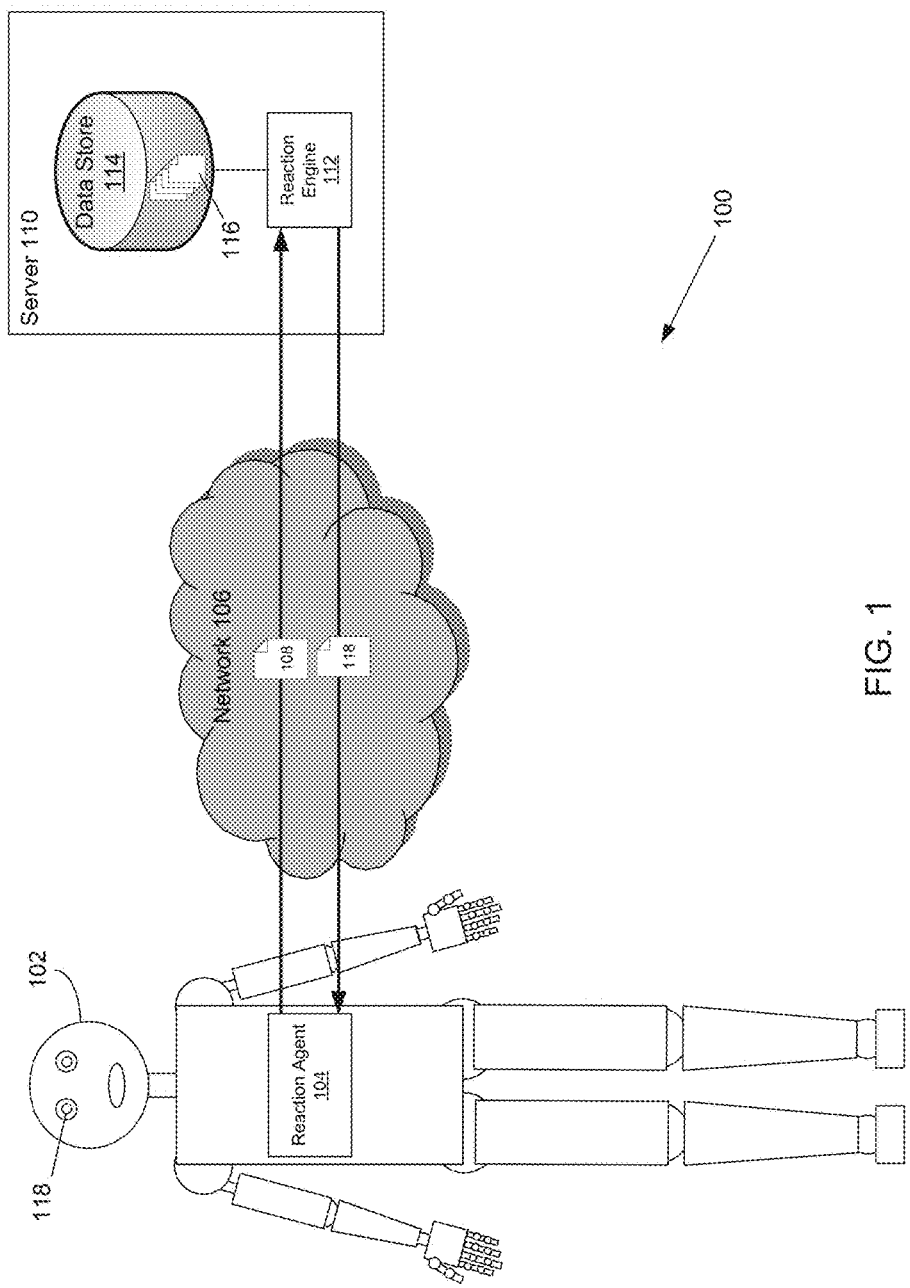
FIG. 1 depicts an interaction of components of an illustrative computing environment, according to some embodiments of the present disclosure.

FIG. 1 depicts the interaction of components of an illustrative computing environment 100, according to some embodiments of the present disclosure. The computing environment 100 may include robotic computing apparatus 102, hereinafter merely referred to as robot 102 for simplicity. Robot 102 may be configured with a reaction agent 104. In embodiments, reaction agent 104 may be configured to transmit a request 108, via a communication interface, to a remote data source (e.g., server 110) over network 106. Network 106 may include any type of wired or wireless network, or any combination thereof, including, but not limited to, WiFi, local area network (LAN), wide area network (WAN), the internet, etc. In embodiments, the request may include context data indicative of an operational context of robot 102. As used herein, an operational context may refer to a context in which robot 102 is currently being operated, has been operated, and/or anticipates being operated.

The context data may be gathered by one or more sensors communicatively coupled with robot 102. As used herein, communicatively coupled may refer to two or more components that may be able to communicate with one another, either directly or indirectly, over any type or combination of electronic communication medium. Such sensors may be integrated with robot 102 (e.g., camera sensor 118) or may be disposed external to robot 102, such as, for example an internet of things (IOT) edge device having one or more sensors incorporated therein. The context data may include data related to any aspect of the operational context, such as, for example, a time and/or date, an activity identifier, a location, an orientation, an ambient temperature, an audio feed, images or video, etc.

Server 110 may be configured with a reaction engine 112 and data store 114. Data store 114 may be configured to store a plurality of reaction records 116. In embodiments, the reaction records 116 may contain reaction data, concerning one or more actions associated with observed human responses, correlated with a context in which the observed human responses occurred. In some embodiments, these observed human responses may be recorded utilizing one or more wearable sensors, such as those discussed in reference to FIG. 2.

Reaction engine 112 may, in some embodiments, be configured to receive request 108 transmitted over network 106. In embodiments, reaction engine 112 may be configured to extract the context data from request 108. The reaction engine may then be configured to provide response 118, via network 106, which may contain reaction data extracted from one or more reaction records of reaction records 116 that correlate with a context similar to the context data contained within request 108. As used herein, a context similar to the context data may be a context within a predefined deviation from the context data. For instance, if the context data indicates a temperature, a similar context may be temperatures within a predefined deviation on either side of the indicated temperature.

Reaction agent 104 of robot 102 may be configured to receive response 118 from server 110 and may also be configured to extract the reaction data contained within response 118. In embodiments, the reaction agent may be further configured to cause the apparatus to carry out the one or more actions associated with the reaction data. These one or more actions may enable robot 102 to mimic a human reaction to a similar context without being pre-programmed for such a reaction. In addition, such reaction data may include vocal pitch or intonations to enable robot 102 to respond with vocal qualities similar to that of a human.

In some embodiments, request 108 may include one or more capabilities associated with robot 102 as part of the context data. In embodiments, these capabilities may be associated with movability of robot 102 (e.g., movable appendages, range of movement, etc.). In such embodiments, reaction engine 112, and the plurality of reaction records 116, may be configured to take these capabilities into account when identifying reaction records to ensure robot 102 receives relevant reaction data in response 118. In other embodiments, the one or more capabilities of robot 102 may have been previously provided (e.g., via prior requests), or otherwise accessible (e.g., in a separate database) to reaction engine 112.

As an illustrative example, the context data may include an audio feed containing the sound of a sneeze with corresponding images and/or video of a person sneezing within proximity of robot 102. Robot 102 may transmit this context data to reaction engine 112 on server 110 as part of request 108. In response, reaction engine 112 may identify one or more reaction records of the plurality of reaction records 116 having a similar context, namely a context denoting a sneeze. Reaction engine 112 may then send the reaction data associated with these identified reaction records to reaction agent 104, which may then cause robot 102 to carry out a response mimicking that of a human (e.g., by saying "bless you," retrieving a tissue, or something similar) without having been pre-programmed to perform such a response. As discussed above, in some embodiments, location may be a part of the context data. In such embodiments, location may also be considered, and instead of "bless you," a more location-oriented response may be utilized by utilizing reaction data associated with that location and thereby associated with language or customs of that location.

As another example, the context data may include an activity identifier of tennis and an ambient temperature of 98 degrees Fahrenheit. Robot 102 may transmit this context data to reaction engine 112 on server 110 as part of request 108. In response, reaction engine 112 may identify one or more reaction records of the plurality of reaction records 116 having a similar context, namely a context of playing tennis on a hot day. Reaction engine 112 may then send the reaction data associated with these identified reaction records to reaction agent 104, which may then cause robot 102 to be able to play tennis as a human would under similar conditions. Such reaction data may include general actions, such as serve speed, or may include much more detailed actions, such as angular momentum of the elbow or wrist, as well as grip pressure, for example.

While depicted herein as a robot, it will be appreciated that this is merely meant to be an example computing device and any computing devices that could benefit from reacting, or responding, to contextual data in a more human-like manner are contemplated. For example, robot 102 may instead be a computing device having a virtual assistant, such as Siri® from Apple® or Cortana® from Microsoft®, embodied thereon.

Figure 2:
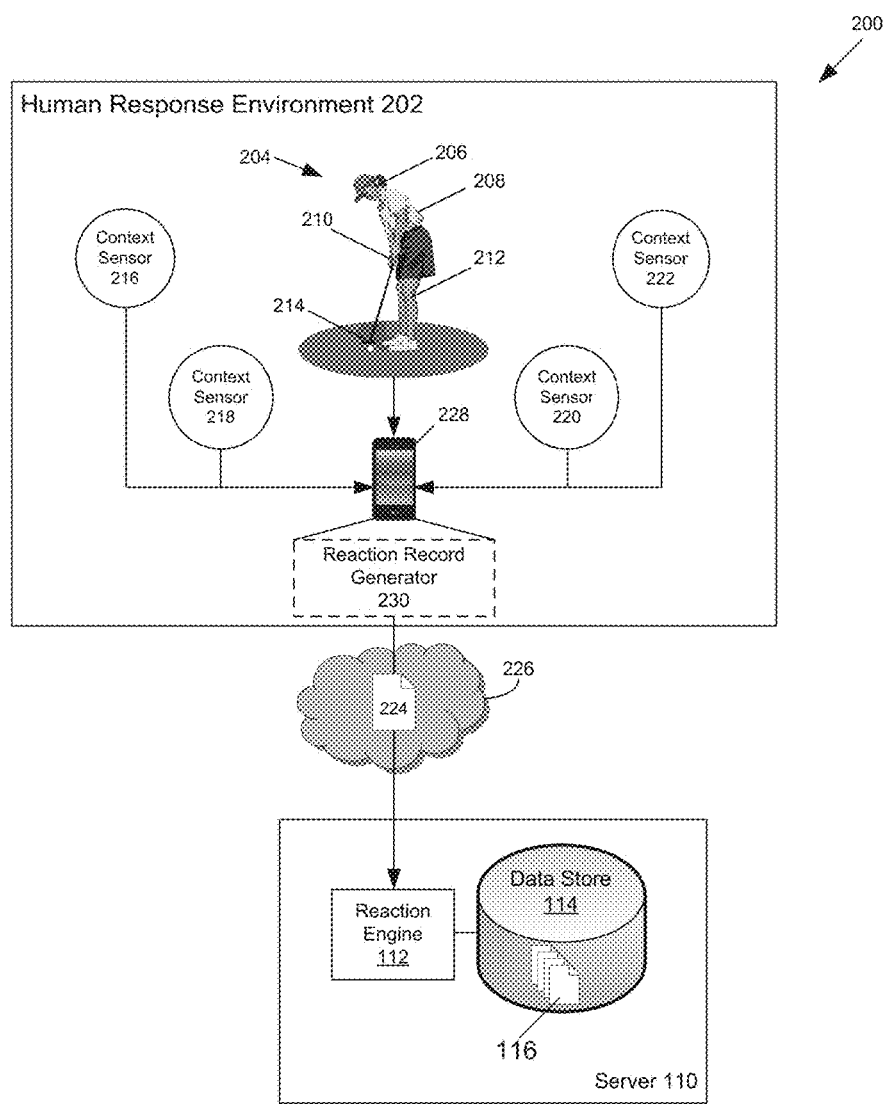
FIG. 2 depicts another interaction of an illustrative computing environment, according to some embodiments of the present disclosure.

FIG. 2 depicts an illustrative computing environment 200, according to some embodiments of the present disclosure. Computing environment 200 may include server 110 of FIG. 1, or another similarly configured server, communicatively coupled, via network 226, with human response environment 202. As discussed above, server 110 may be configured with reaction engine 112 and data store 114. As above, data store 114 may be configured to store a plurality of reaction records 116. In embodiments, the reaction records 116 may contain reaction data concerning one or more actions associated with observed human responses correlated with a context in which the observed human responses occurred.

In embodiments, reaction engine 112 may be configured to receive new reaction record 224 over network 226 to be added to the plurality of reaction records 116. In embodiments, new reaction record 224 may include new reaction data indicative of a new human response as well as context data associated with a context in which the new human response occurred. The addition of new reaction record 224 to reaction records 116 may enable provision of the new reaction data contained therein in response to a request for reaction data (e.g., request 108 of FIG. 1) associated with a context similar to the context correlated with the new reaction data.

As depicted by human response environment 202, new reaction record 224 may include reaction data indicative of a response of user 204 to the context data associated with playing golf. Such new reaction data may be generated by one or more reaction data sensors 206-214 and the correlated context data may be generated by context sensors 216-222. As depicted, these sensors 206-222 may be communicatively coupled with server 110 by way of smartphone 228. In such an embodiment, smartphone 228 may be configured with a reaction record generator 230 configured to assemble reaction data from reaction data sensors 206-214 and context data from context sensors 216-222 into a new reaction record and transmit the new reaction record (e.g., new reaction record 224) to server 110 via network 226.

In other embodiments, the individual sensors 206-222 may each be communicatively coupled with server 110, without smartphone 228 as an intermediary, and may be configured to transmit collected data to server 110. In such embodiments, reaction engine 112 may be configured to generate a reaction record by correlating the collected data into a reaction record. For example, reaction engine 112 may be configured to correlate reaction data generated by sensors 206-214 with context data generated by context sensors 216-222 utilizing a timestamp indicating a time of collection and or a location stamp indicating a location of collection to perform the correlation.

As depicted, reaction data sensors 206-212 may include one or more wearable sensing devices (e.g., wearable sensing devices 206-212) worn by user 204 and/or one or more other sensors (e.g., golf club head sensor 214). Sensing devices 206-214 may be configured to gather data on velocity, angle, orientation, or any other measurement that may be useful in re-creating the movement of user 204. These sensing devices may be coupled with smartphone 228 via any sort of communication medium such as, for example, Bluetooth, WiFi, etc. In embodiments where the sensors are communicatively coupled with server 110 without smartphone 228 as intermediary, individual sensors may be communicatively coupled with server 110 over network 226. In other embodiments, movements of user 204 may be monitored by a three dimensional camera arrangement, such as Kinect® from Microsoft®. In such embodiments, wearable sensors 206-212 may not be necessary or may be used to fine-tune the data generated by the three dimensional camera arrangement.

Reaction data sensors 206-214 may, as mentioned above, collectively record movements of user 204, and these recorded movements may be included into the new reaction data. For example, as depicted, sensor 206 may record head movement of user 204; sensor 208 may record torso movement of user 204; sensor 210 may record hand, wrist, and/or arm movement of user 204; and sensor 212 may record knee and/or leg movement of user 204. It will be appreciated that each of these recorded movements are for illustrative purposes only and that any type of recorded movement is contemplated by the present disclosure. Such recorded movement may include one or more of finger movement, hand movement, arm movement, head movement, eye movement, torso movement, hip movement, leg movement.

In some embodiments, context data may also be recorded by one or more sensors (e.g., sensors 216-222), and this context data may be recorded and associated with the reaction data to provide contextual information to the reaction data. The context data may include data related to any aspect of the context associated with the recorded human responses, such as, for example, time and/or date, activity identifier, a location, an orientation, an ambient temperature, an audio feed, images or video, etc. In this example, the context data may include, for example, a hole number on which the human response was recorded; a handicap for user 204, which may enable an apparatus, such as robot 102 of FIG. 1, to receive reaction data associated with a handicap of a player that robot 102 may be playing against; or any other information that may add context to the human response.

In some embodiments, to add the new reaction record 224 to the plurality of reaction records 116, reaction engine 112 may merely store new reaction record 224 as a new reaction record. In other embodiments, reaction engine 112 may be configured to normalize new reaction record 224. Normalization of new reaction record 224 may include normalization of the data contained within new reaction record 224 with reaction data records of the plurality of reaction records 116 having similar context. Normalization of the reaction records may enable outlier human responses to be attenuated based on other recorded human responses. For instance, in the golf example above, a human response recorded by a player that is merely messing around and trying to outdrive those he is playing against without any regard for accuracy may be attenuated by those players that are taking the hole more seriously. In addition, this normalization may act to hide the identity of the user who was utilized in recording the reaction data.

In embodiments, user 204 may volunteer to have the user's responses monitored. In other embodiments, user 204 may be remunerated for providing data concerning the user's responses. In either of these embodiments, user 204 may, in some embodiments, have control over the use of the data generated by the user's responses and over what data is recorded.

Figure 3:
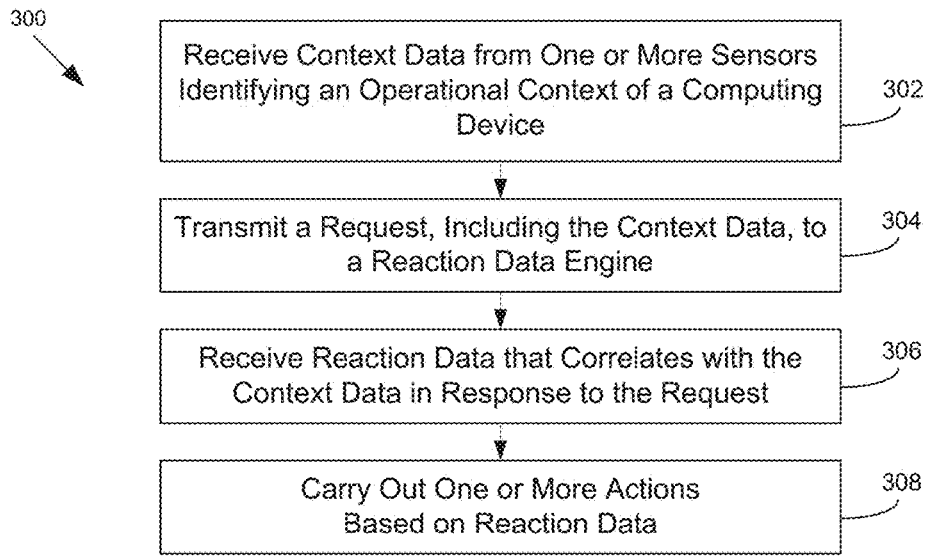
FIG. 3 is a flow chart depicting an illustrative method associated with a reaction agent of a computing device, according to some embodiments of the present disclosure.

FIG. 3 is a flow chart depicting an illustrative process 300 associated with a reaction agent of a computing device (e.g., reaction agent 104 of FIG. 1), according to various embodiments of the present disclosure. The process may begin at block 302, where the reaction agent may receive context data from one or more sensors, such as those discussed above in reference to FIG. 1, concerning an operational context of the computing device. At block 304, the reaction agent may transmit a request, including the context data, to a reaction engine, such as reaction engine 112 of FIGS. 1 and 2.

At block 306, the reaction agent may receive reaction data that correlates with the context data in response to the request. In embodiments, the reaction data may be derived from previously observed, or recorded, human responses. In some embodiments, the reaction data may include data concerning one or more actions associated with the previously observed, or recorded, human responses. Such reaction data may, in some embodiments, be recorded by one or more wearable sensing devices worn by a human, such as those discussed above in reference to FIG. 2. In some embodiments, the request transmitted at block 304 may include one or more capabilities associated with the computing device, such as capabilities associated with movability (e.g., movable appendages, range of movement, etc.). In such embodiments, the reaction data received at block 306 may be further based on these capabilities to ensure the computing device is receiving relevant data. For example, a virtual assistant may not be able to move at all, and as a result, any movement data may be unnecessary to the virtual assistant.

At block 308, the reaction agent may cause the computing device, such as robot 102 of FIG. 1, to carry out one or more actions based on the reaction data received to enable the computing device to mimic human reactions. For example, if the reaction data indicates movements to be performed by the computing device, such as playing a musical instrument, then the reaction agent may cause the computing device to carry out the playing of the musical instrument in accordance with the reaction data received.

Figure 4:
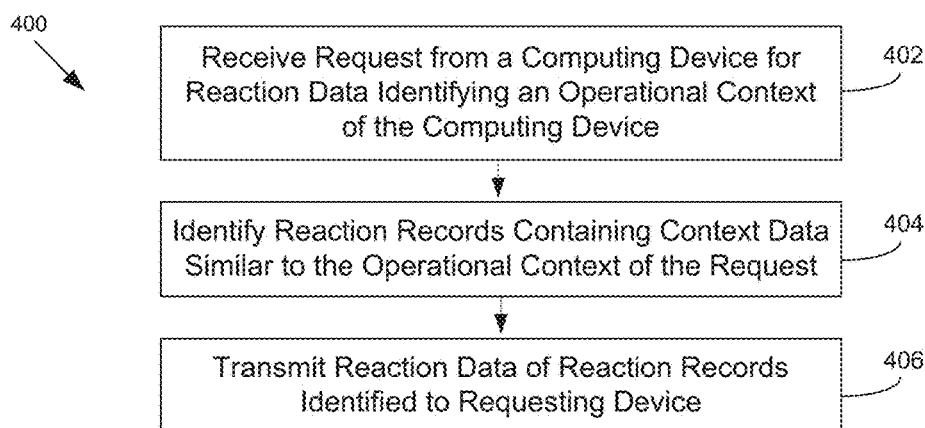
FIG. 4 is a flow chart depicting an illustrative method associated with a reaction engine receiving a request for reaction data.

FIG. 4 is a flow chart depicting an illustrative process 400 associated with a reaction engine of a server receiving a request for reaction data, according to various embodiments of the present disclosure. The process may begin at block 402, where a reaction engine may receive a request for reaction data from a computing device. In embodiments, the request may include context data identifying an operational context of the computing device, such as that discussed above in reference to FIG. 1.

At block 404, the reaction engine may identify reaction records, accessible by the reaction engine (e.g., reaction records 116 of FIGS. 1 and 2), that have a context contained therein similar to the operational context of the computing device. The reaction engine may then extract reaction data contained within the identified reaction records. In embodiments, the reaction data contained within the reaction records may have been previously recorded by one or more wearable sensing devices worn by a human.

At block 406, the reaction engine may transmit reaction data extracted from the reaction records identified at block 404 to the requesting device. In embodiments, this reaction data may enable the computing device to mimic a human reaction. In embodiments, where the reaction data was recorded by one or more wearable sensing devices, the reaction data may enable the computing device to mimic human reaction by enabling the computing device to carry out one or more movements of the human recorded by the one or more wearable sensing devices. Such movements may include, but are not limited to, finger movement, hand movement, arm movement, head movement, eye movement, torso movement, hip movement, leg movement. In addition, such reaction data may include vocal pitch or intonations to enable the computing device to respond with vocal qualities similar to that of a human.

Figure 5:
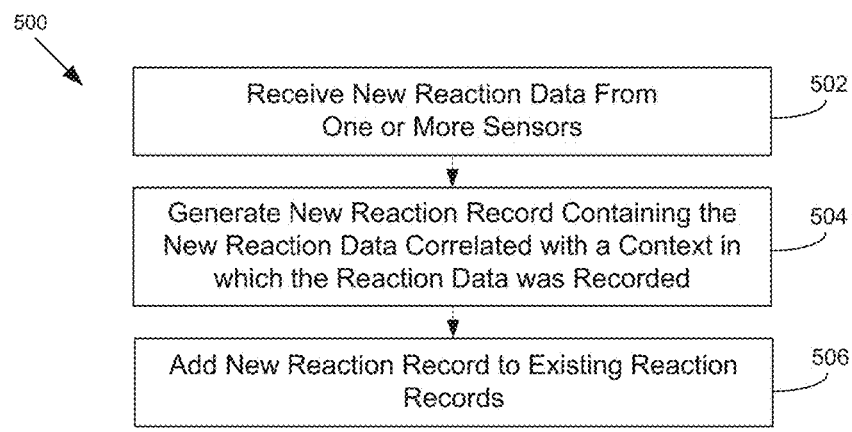
FIG. 5 is another flow chart depicting an illustrative process associated with a reaction engine receiving new reaction data.

FIG. 5 is a flow chart depicting an illustrative process 500 associated with a reaction engine receiving new reaction data from one or more sensors, such as those discussed in reference to FIG. 2, according to various embodiments of the present disclosure. The process may begin at block 502, where the reaction engine may receive new reaction data from one or more sensors. In some embodiments, the reaction data may be correlated with context data, associated with a context in which the reaction data was recorded, to generate a new reaction record. In other embodiments, the reaction engine may receive reaction data separate from context data associated with a context in which the reaction data was recorded. In such embodiments, the reaction engine may be configured to correlate the reaction data with the context data to generate a new reaction record at block 504. This correlation may be based, for example, on a time and/or location in which the reaction data and context data were collected.

At block 506, the new reaction record may be added to the existing reaction records. In embodiments, this may enable provisioning of the new reaction data in response to a request for reaction data containing context data similar to the context associated with the new reaction data. In some embodiments, to add the new reaction record to the existing reaction records may include normalizing the new reaction data with reaction data contained within the reaction records, as discussed in reference to FIG. 2, above.

Figure 6:
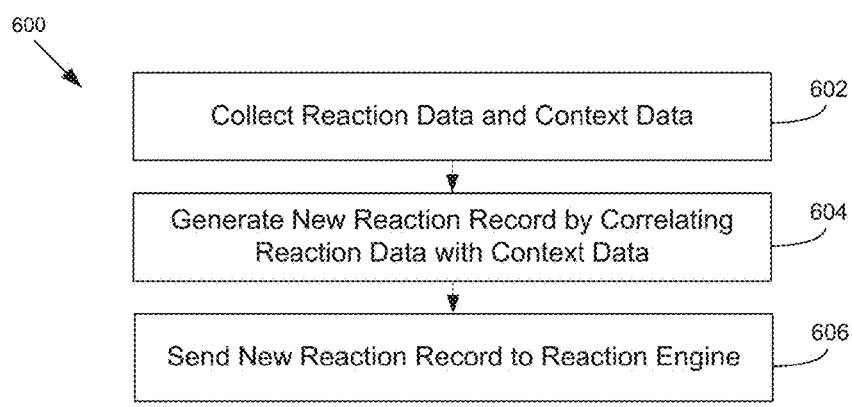
FIG. 6 is a flow chart depicting an illustrative process associated with a reaction record generator, in accordance with some embodiments of the present disclosure.

FIG. 6 is a flow chart depicting an illustrative process 600 associated with generating a reaction record, in accordance with various embodiments of the present disclosure. The process may begin at block 602, where reaction data and context data may be collected from a plurality of sensors by a reaction record generator (e.g., reaction record generator 230 of FIG. 2) or a reaction engine (e.g., reaction engine 112 of FIGS. 1 and 2). At block 604, the reaction record generator may generate a new reaction record by correlating the collected reaction data with the collected context data. This correlation may be based, for example, on the time and/or location of where the reaction data and the context data were collected. At block 606, the reaction record generator may transmit the reaction record generated at block 604 to a reaction engine for incorporation with a plurality of other reaction records, such as reaction records 116 of FIGS. 1 and 2. In embodiments where the reaction record is generated by the reaction engine, block 606 may be omitted.

Figure 7:
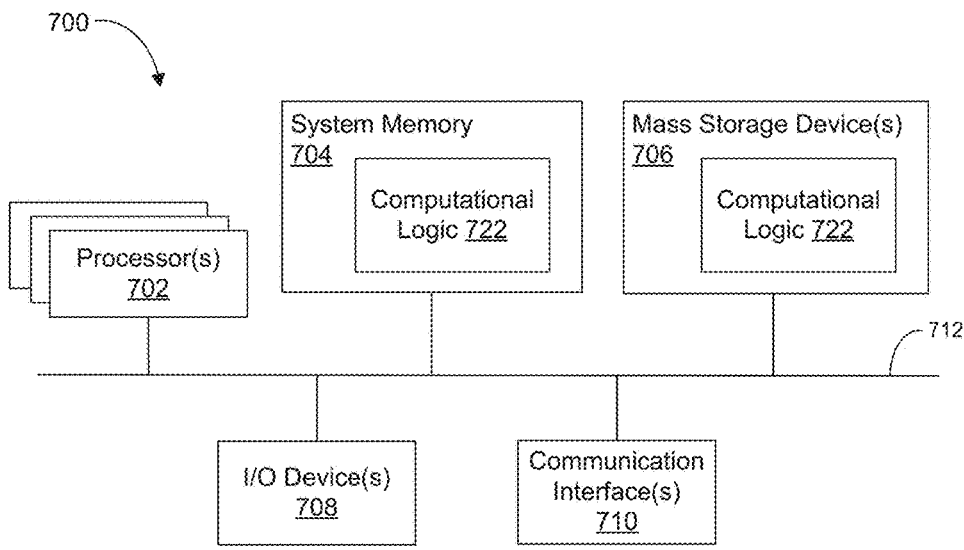
FIG. 7 depicts an illustrative apparatus, according to some embodiments of the present disclosure.

Referring now to FIG. 7, an example computing device 700 suitable to implement a reaction agent (e.g., reaction agent 104 of FIG. 1), a reaction engine and data store (e.g., reaction engine 112 and data store 114 of FIGS. 1 and 2), or a reaction record generator (e.g., reaction record generator 230 of FIG. 2), in accordance with various embodiments, is illustrated. As shown, computing device 700 may include one or more processors or processor cores 702 and system memory 704. In embodiments, multiple processor cores 702 may be disposed on one die. For the purpose of this application, including the claims, the terms "processor" and "processor cores" may be considered synonymous, unless the context clearly requires otherwise. Additionally, computing device 700 may include mass storage device(s) 706 (such as diskette, hard drive, compact disc read-only memory (CD-ROM), and so forth), input/output (I/O) device(s) 708 (such as any of the sensors discussed above, a display, a keyboard, any type of cursor control, and so forth), and communication interfaces 710 (such as network interface cards, modems, and so forth). These elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage device(s) 706 may be employed to store a working copy and a permanent copy of programming instructions implementing the operations described earlier, e.g., but not limited to, operations associated with reaction agent 104; reaction engine 112 and data store 114; and/or reaction record generator 230, generally referred to as computational logic 722. The various operations may be implemented by assembler instructions supported by processor(s) 702 or high-level languages, such as, for example, C, that may be compiled into such instructions.

The permanent copy of the programming instructions may be placed into permanent mass storage device(s) 706 in the factory, or in the field, through, for example, a distribution medium (not shown), such as a compact disc (CD), or through communication interface 710 (from a distribution server (not shown)). That is, one or more distribution media having an implementation of reaction agent 104, reaction engine 112 and data store 114, and/or reaction record generator 230 may be employed to distribute the adaptive learning platform or dashboard and program various computing devices.

The number, capability, and/or capacity of these elements 710-712 may vary, depending on the intended use of example computing device 700, e.g., whether example computing device 700 is a smartphone, tablet, ultrabook, laptop, or desktop. The constitutions of these elements 710-712 are otherwise known, and accordingly will not be further described.

Figure 8:
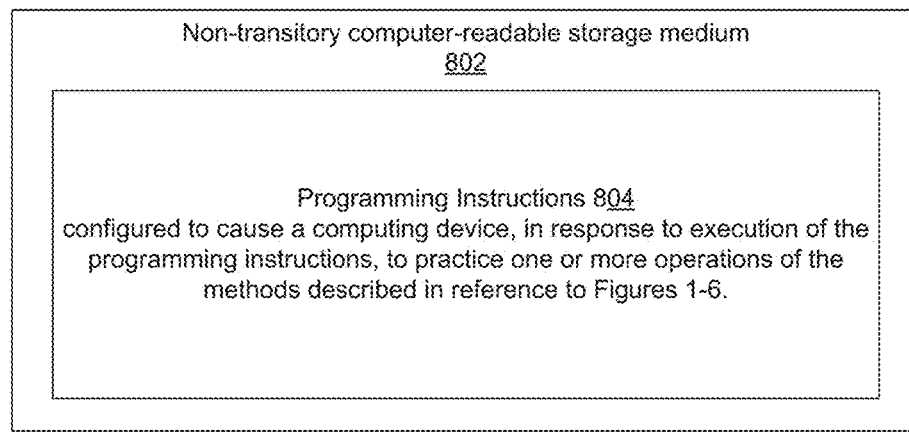
FIG. 8 illustrates an example storage medium with instructions configured to enable a computing device to practice the present disclosure, in accordance with various embodiments.

FIG. 8 illustrates an example non-transitory computer-readable storage medium having instructions configured to practice all or selected ones of the operations associated with reaction agent 104, reaction engine 112 and data store 114, and/or reaction record generator 230, earlier described, in accordance with various embodiments. As illustrated, non-transitory computer-readable storage medium 802 may include a number of programming instructions 804. Programming instructions 804 may be configured to enable a device, e.g., computing device 700, in response to execution of the programming instructions, to perform one or more operations of the processes described in reference to FIGS. 1-6. In alternate embodiments, programming instructions 804 may be disposed on multiple non-transitory computer-readable storage media 802 instead. In still other embodiments, programming instructions 804 may be encoded in transitory computer-readable signals.

Referring back to FIG. 7, for one embodiment, at least one of processors 702 may be packaged together with computational logic 722 (in lieu of storing in memory 704 and/or mass storage 706) configured to perform one or more operations of the processes described with reference to FIGS. 1-6. For one embodiment, at least one of processors 702 may be packaged together with computational logic 722 configured to practice aspects of the methods described in reference to FIGS. 1-6 to form a System in Package (SiP). For one embodiment, at least one of processors 702 may be integrated on the same die with computational logic 722 configured to perform one or more operations of the processes described in reference to FIGS. 1-6. For one embodiment, at least one of processors 702 may be packaged together with computational logic 722 configured to perform one or more operations of the processes described in reference to FIGS. 1-6 to form a System on Chip (SoC). Such an SoC may be utilized in any suitable computing device.

Embodiments of the disclosure can take the form of an entirely hardware embodiment, an entirely software embodiment, or an embodiment containing both hardware and software elements. In various embodiments, software may include, but is not limited to, firmware, resident software, microcode, and the like. Furthermore, the disclosure can take the form of a computer program product accessible from a computer-usable or computer-readable medium providing program code for use by or in connection with a computer or any instruction execution system. As used herein, "module" may refer to hardware, software, or a combination of hardware and software.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a USB drive, a random access memory (RAM), a read-only memory (ROM), a rigid magnetic disk, and an optical disk. Current examples of optical disks include compact disk read-only memory (CD-ROM), compact disk read/write (CD-R/W), and digital video disk (DVD).

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

EXAMPLES

Some non-limiting examples are:

Example 1 may include an apparatus comprising: a communication module; and a reaction agent, coupled with the communication module, to: transmit, via the communication module, a request to a remote data source, wherein the request includes context data indicative of an operational context of the apparatus; and receive, in response to the request, via the communication module, reaction data for the apparatus to react to the operational context, wherein the reaction data is derived from previous observations of human response to a context similar to the operational context indicated by the context data of the request.

Example 2 may include the subject matter of Example 1, wherein the reaction data includes data concerning one or more actions associated with the previously observed human response.

Example 3 may include the subject matter of Example 2, wherein the reaction agent is further to cause the apparatus to carry out the one or more actions.

Example 4 may include the subject matter of Example 3, wherein at least a portion of the reaction data is previously recorded by one or more wearable sensing devices worn by a human.

Example 5 may include the subject matter of Example 4, wherein the one or more actions include movements of the human recorded by the one or more wearable sensing devices.

Example 6 may include the subject matter of Example 4, wherein the reaction data recorded by the one or more wearable sensing devices include data of one or more of finger movement, hand movement, arm movement, head movement, eye movement, torso movement, hip movement, leg movement, or vocal pitch.

Example 7 may include the subject matter of any one of Examples 1-6, wherein the request further includes capability data associated with the apparatus that identifies one or more capabilities of the apparatus, and wherein the reaction data received is based, at least in part on the capability data.

Example 8 may include the subject matter of Example 7, wherein the one or more capabilities are associated with possible movements of the apparatus.

Example 9 may include the subject matter of any one of Examples 1-8, wherein the apparatus is a robot.

Example 10 may include a method comprising: transmitting, by a reaction agent of an apparatus, a request to a remote data source, wherein the request includes context data indicative of an operational context of the apparatus; and receiving, by the reaction agent, reaction data for the apparatus to utilize in reacting to the operational context, wherein the reaction data is derived from previous observations of human response to a context similar to the operational context indicated by the context data of the request.

Example 11 may include the subject matter of Example 10, wherein the reaction data includes data concerning one or more actions associated with the previously observed human response and further comprising causing, by the reaction agent, the apparatus to carry out the one or more actions.

Example 12 may include the subject matter of Example 11, wherein at least a portion of the reaction data is previously recorded by one or more wearable sensing devices worn by a human.

Example 13 may include the subject matter of Example 12, wherein the one or more actions include movements of the human recorded by the one or more wearable sensing devices.

Example 14 may include the subject matter of Example 12, wherein the reaction data recorded by the one or more wearable sensing devices include data of one or more of finger movement, hand movement, arm movement, head movement, eye movement, torso movement, hip movement, leg movement, or vocal pitch.

Example 15 may include the subject matter of any one of Examples 10-14, wherein the request further identifies one or more capabilities of the apparatus and wherein the reaction data received is based, at least in part on the one or more capabilities.

Example 16 may include the subject matter of Example 15, wherein the one or more capabilities are associated with possible movements of the apparatus.

Example 17 may include the subject matter of any one of Examples 10-16, wherein the apparatus is a robot.

Example 18 may include one or more computer-readable media having a plurality of instructions stored thereon, wherein the plurality of instructions, when executed by a processor of an apparatus, cause the apparatus to: transmit a request to a remote data source, wherein the request includes context data indicative of an operational context of the apparatus; and receive, in response to the request, reaction data to be utilized in reacting to the operational context, wherein the reaction data is derived from previous observations of human response to a context similar to the operational context indicated by the context data of the request.

Example 19 may include the subject matter of Example 18, wherein the reaction data includes data concerning one or more actions associated with the previously observed human response, and wherein the plurality of instructions, when executed by the processor, further cause the apparatus to carry out the one or more actions.

Example 20 may include the subject matter of Example 19, wherein at least a portion of the reaction data is previously recorded by one or more wearable sensing devices worn by a human.

Example 21 may include the subject matter of Example 20, wherein the one or more actions include movements of the human recorded by the one or more wearable sensing devices.

Example 22 may include the subject matter of Example 20, wherein the reaction data recorded by the one or more wearable sensing devices include data of one or more of finger movement, hand movement, arm movement, head movement, eye movement, torso movement, hip movement, leg movement, or vocal pitch.

Example 23 may include the subject matter of any one of Examples 18-22, wherein the request further identifies one or more capabilities of the apparatus and wherein the reaction data received is based, at least in part on the one or more capabilities.

Example 24 may include the subject matter of Example 23, wherein the one or more capabilities are associated with possible movements of the apparatus.

Example 25 may include the subject matter of any one of Examples 18-24, wherein the apparatus is a robot.

Example 26 may include a computing device comprising: means for transmitting a request to a remote data source, wherein the request includes context data indicative of an operational context of the apparatus; and means for receiving reaction data for the apparatus to utilize in reacting to the operational context, wherein the reaction data is derived from previous observations of human response to a context similar to the operational context indicated by the context data of the request.

Example 27 may include the subject matter of Example 26, wherein the reaction data includes data concerning one or more actions associated with the previously observed human response and further comprising means for causing the apparatus to carry out the one or more actions.

Example 28 may include the subject matter of Example 27, wherein at least a portion of the reaction data is previously recorded by one or more wearable sensing devices worn by a human.

Example 29 may include the subject matter of Example 28, wherein the one or more actions include movements of the human recorded by the one or more wearable sensing devices.

Example 30 may include the subject matter of Example 28, wherein the reaction data recorded by the one or more wearable sensing devices include data of one or more of finger movement, hand movement, arm movement, head movement, eye movement, torso movement, hip movement, leg movement, or vocal pitch.

Example 31 may include the subject matter of any one of Examples 26-30, wherein the request further identifies one or more capabilities of the apparatus and wherein the reaction data received is based, at least in part on the one or more capabilities.

Example 32 may include the subject matter of Example 31, wherein the one or more capabilities are associated with possible movements of the apparatus.

Example 33 may include the subject matter of any one of Examples 26-32, wherein the apparatus is a robot.

Example 34 may include a server comprising: a storage device to store a plurality of reaction records, wherein each of the plurality of reaction records contains reaction data of an observed human response correlated with a context; and a reaction engine, coupled with the storage device, to provide reaction data of one or more of the plurality of reaction records, in response to a request from a remote apparatus, that contains context data indicative of an operational context of the remote apparatus to enable the remote apparatus to mimic human response.

Example 35 may include the subject matter of Example 34, wherein to provide reaction data further comprises: identification of one or more reaction records of the plurality of reaction records, correlated with a context similar to the context data contained within the request; and transmission, to the remote apparatus, of reaction data contained within the one or more reaction records.

Example 36 may include the subject matter of Example 34, wherein the reaction engine is further to: receive, from one or more sensors communicatively coupled with the server, new reaction data indicative of a new human response associated with a context in which the new human response occurred; and add the new reaction data to the reaction records to enable provision of the new reaction data in response to a request for reaction data containing context data similar to the context associated with the new reaction data.

Example 37 may include the subject matter of Example 36, wherein to add the new reaction data to the reaction records is to normalize the new reaction data with reaction data contained within the reaction records.

Example 38 may include the subject matter of any one of Examples 34-37, wherein at least a portion of the reaction data of the plurality of reaction record is previously recorded by one or more wearable sensing devices worn by a human.

Example 39 may include the subject matter of Example 38, wherein to mimic human response is to carry out one or more actions that include movements of the human recorded by the one or more wearable sensing devices.

Example 40 may include the subject matter of Example 38, wherein the reaction data recorded by the one or more wearable sensing devices include data of one or more of finger movement, hand movement, arm movement, head movement, eye movement, torso movement, hip movement, leg movement, or vocal pitch.

Example 41 may include a method comprising: receiving, by a server, a request from a remote apparatus for reaction data, wherein the request contains context data indicative of an operational context of the remote apparatus; accessing, by the server, in response to the request, a plurality of reaction records contained on a storage device accessible to the server, wherein each of the plurality of reaction records contains reaction data of an observed human response correlated with a context; identifying one or more reaction records of the plurality of reaction records, correlated with a context similar to the context data contained within the request; and transmitting, to the remote apparatus, reaction data contained within the one or more reaction records to enable the remote apparatus to mimic human response.

Example 42 may include the subject matter of Example 41, wherein the reaction engine is further to: receiving, by the server, from one or more sensors, new reaction data indicative of a new human response associated with a context in which the new human response occurred; and adding the new reaction data to the reaction records to enable provisioning of the new reaction data in response to a request for reaction data containing context data similar to the context associated with the new reaction data.

Example 43 may include the subject matter of Example 42, wherein adding the new reaction data to the reaction records further comprises normalizing the new reaction data with reaction data contained within the reaction records.

Example 44 may include the subject matter of any one of Examples 41-43, wherein at least a portion of the reaction data contained within the plurality of reaction records is previously recorded by one or more wearable sensing devices worn by a human.

Example 45 may include the subject matter of Example 44, wherein to enable the remote apparatus to mimic human response is to enable the remote apparatus to carry out one or more actions that include movements of the human recorded by the one or more wearable sensing devices.

Example 46 may include the subject matter of Example 44, wherein the reaction data recorded by the one or more wearable sensing devices include data of one or more of finger movement, hand movement, arm movement, head movement, eye movement, torso movement, hip movement, leg movement, or vocal pitch.

Example 47 may include one or more computer-readable media having a plurality of instructions stored thereon, wherein the plurality of instructions, when executed by a processor of a server, cause the server to: receive a request from a remote apparatus for reaction data, wherein the request contains context data indicative of an operational context of the remote apparatus; access, in response to the request, a plurality of reaction records contained on a storage device accessible to the server, wherein each of the plurality of reaction records contains reaction data of an observed human response correlated with a context; and provide reaction data of one or more of the plurality of reaction records to enable the remote apparatus to mimic human response.

Example 48 may include the subject matter of Example 47, wherein to provide reaction data further comprises: identification of one or more reaction records of the plurality of reaction records, correlated with a context similar to the context data contained within the request; and transmission, to the remote apparatus, of reaction data contained within the one or more reaction records.

Example 49 may include the subject matter of Example 47, wherein the plurality of instructions, when executed by the processors, further cause the server to: receive, by the server, from one or more sensors, new reaction data indicative of a new human response associated with a context in which the new human response occurred; and add the new reaction data to the reaction records to enable provisioning of the new reaction data in response to a request for reaction data containing context data similar to the context associated with the new reaction data.

Example 50 may include the subject matter of Example 49, wherein to add the new reaction data to the reaction records is to normalize the new reaction data with reaction data contained within the reaction records.

Example 51 may include the subject matter of any one of Examples 47-50, wherein at least a portion of the reaction data contained within the plurality of reaction records is previously recorded by one or more wearable sensing devices worn by a human.

Example 52 may include the subject matter of Example 51, wherein to enable the remote apparatus to mimic human response is to enable the remote apparatus to carry out one or more actions that include movements of the human recorded by the one or more wearable sensing devices.

Example 53 may include the subject matter of Example 51, wherein the reaction data recorded by the one or more wearable sensing devices include data of one or more of finger movement, hand movement, arm movement, head movement, eye movement, torso movement, hip movement, leg movement, or vocal pitch.

Example 54 may include a computing device comprising: means for receiving, by a server, a request from a remote apparatus for reaction data, wherein the request contains context data indicative of an operational context of the remote apparatus; means for accessing, by the server, in response to the request, a plurality of reaction records contained on a storage device accessible to the server, wherein each of the plurality of reaction records contains reaction data of an observed human response correlated with a context; means for identifying one or more reaction records of the plurality of reaction records, correlated with a context similar to the context data contained within the request; and means for transmitting, to the remote apparatus, reaction data contained within the one or more reaction records to enable the remote apparatus to mimic human response.

Example 55 may include the subject matter of Example 54, wherein the reaction engine is further to: means for receiving, by the server, from one or more sensors, new reaction data indicative of a new human response associated with a context in which the new human response occurred; and means for adding the new reaction data to the reaction records to enable provisioning of the new reaction data in response to a request for reaction data containing context data similar to the context associated with the new reaction data.

Example 56 may include the subject matter of Example 55, wherein the means for adding the new reaction data to the reaction records further comprises means for normalizing the new reaction data with reaction data contained within the reaction records.

Example 57 may include the subject matter of any one of Examples 54-56, wherein at least a portion of the reaction data contained within the plurality of reaction records is previously recorded by one or more wearable sensing devices worn by a human.

Example 58 may include the subject matter of Example 57, wherein to enable the remote apparatus to mimic human response is to enable the remote apparatus to carry out one or more actions that include movements of the human recorded by the one or more wearable sensing devices.

Example 59 may include the subject matter of Example 57, wherein the reaction data recorded by the one or more wearable sensing devices include data of one or more of finger movement, hand movement, arm movement, head movement, eye movement, torso movement, hip movement, leg movement, or vocal pitch.

Example 60 may include a computing device comprising: a communication interface; and a reaction record generator coupled with the communication interface to receive, via the communication interface, reaction data indicative of an observed human response produced by one or more reaction data sensors and context data indicative of a context in which the observed human response occurred produced by one or more context data sensors; correlate the reaction data with the context data to generate a new reaction record; and transmit the new reaction record to a remote computing device to be integrated with a plurality of additional reaction records to enable provisioning of the new reaction record.

Example 61 may include the subject matter of Example 60, wherein to correlate the reaction data with the context data is based on one or more of time or location in which the reaction data or the context data is collected.

Example 62 may include the subject matter of either of Examples 60 or 61, wherein the one or more reaction data sensors include one or more wearable sensing devices worn by a human.

Example 63 may include a computer-implemented method comprising: receiving, by a reaction record generator of a computing device, reaction data indicative of an observed human response produced by one or more reaction data sensors and context data indicative of a context in which the observed human response occurred produced by one or more context data sensors; correlating, by the reaction record generator, the reaction data with the context data to generate a new reaction record; and transmitting the new reaction record to a remote computing device to be integrated with a plurality of additional reaction records to enable provisioning of the new reaction record.

Example 64 may include the subject matter of Example 63, wherein correlating the reaction data with the context data is based on one or more of time or location in which the reaction data or the context data is collected.

Example 65 may include the subject matter of either of Examples 63 or 64, wherein the one or more reaction data sensors include one or more wearable sensing devices worn by a human.

Example 66 may include one or more computer-readable media having a plurality of instructions stored thereon, wherein the plurality of instructions, when executed by a processor of a computing device, cause the computing device to: receive reaction data indicative of an observed human response produced by one or more reaction data sensors and context data indicative of a context in which the observed human response occurred produced by one or more context data sensors; correlating the reaction data with the context data to generate a new reaction record; and transmitting the new reaction record to a remote computing device to be integrated with a plurality of additional reaction records to enable provisioning of the new reaction record.

Example 67 may include the subject matter of Example 66, wherein correlating the reaction data with the context data is based on one or more of time or location in which the reaction data or the context data is collected.

Example 68 may include the subject matter of either of Examples 66 or 67, wherein the one or more reaction data sensors include one or more wearable sensing devices worn by a human.

Example 69 may include a computing device comprising: means for receiving, by a reaction record generator of a computing device, reaction data indicative of an observed human response produced by one or more reaction data sensors and context data indicative of a context in which the observed human response occurred produced by one or more context data sensors; means for correlating, by the reaction record generator, the reaction data with the context data to generate a new reaction record; and means for transmitting the new reaction record to a remote computing device to be integrated with a plurality of additional reaction records to enable provisioning of the new reaction record.

Example 70 may include the subject matter of Example 69, wherein correlating the reaction data with the context data is based on one or more of time or location in which the reaction data or the context data is collected.

Example 71 may include the subject matter of either of Examples 69 or 70, wherein the one or more reaction data sensors include one or more wearable sensing devices worn by a human.

What is claimed is:

1. An apparatus comprising:
   one or more computing processors;
   physical memory coupled with the one or more processors;
   a communication module, to be loaded into the physical memory and executed by the one or more processors, to communicate with a remote data source, wherein the communication module is to:
     receive or transmit data between the apparatus and the remote data source; and
   a reaction agent module, to be loaded into the physical memory and executed by the one or more processors, to:
     transmit, via the communication module, a request to the remote data source, wherein the request is to include context data indicative of an operational context of the apparatus and data associated with the apparatus that identifies one or more capabilities of the apparatus;
     receive, in response to the request, via the communication module, reaction data for the apparatus to react to the operational context, wherein the reaction data is derived from a plurality of reaction records based upon previous observations of responses of a plurality of humans to a context similar to the operational context indicated by the context data of the request and wherein the reaction data received is based, at least in part, on the capability data; and
     cause the apparatus to carry out one or more actions.

2. The apparatus of claim 1, wherein the reaction data includes data concerning one or more actions associated with the previously observed human responses.

3. The apparatus of claim 1, wherein at least a portion of the reaction data is previously recorded by one or more wearable sensing devices worn by the plurality of humans.

4. The apparatus of claim 3, wherein the one or more actions include movements of the human recorded by the one or more wearable sensing devices.

5. The apparatus of claim 3, wherein the reaction data recorded by the one or more wearable sensing devices include data of one or more of finger movement, hand movement, arm movement, head movement, eye movement, torso movement, hip movement, leg movement, or vocal pitch.

6. The apparatus of claim 1, wherein the one or more capabilities are associated with possible movements of the apparatus.

7. The apparatus of claim 1, wherein the apparatus is a robot.

8. A computer-based method for implementing an apparatus, the method comprising:
    transmitting, by a reaction agent of the apparatus, a request to a remote data source, wherein the request includes context data indicative of an operational context of the apparatus and data associated with the apparatus that identifies one or more capabilities of the apparatus;
    receiving, by the reaction agent, reaction data for the apparatus to utilize in reacting to the operational context, wherein the reaction data is derived from previous observations of responses of a plurality of humans to a context similar to the operational context indicated by the context data of the request and wherein the reaction data received is based, at least in part, on the capability data; and
    causing the apparatus to carry out one or more actions based at least on the reaction data and the operational context.

9. The method of claim 8, wherein the reaction data includes data concerning one or more actions associated with the previously observed human responses and further includes causing, by the reaction agent, the apparatus to carry out the one or more actions.

10. The method of claim 9, wherein at least a portion of the reaction data is previously recorded by one or more wearable sensing devices worn by the plurality of humans.

11. The method of claim 10, wherein the one or more actions include movements of the plurality of humans recorded by the one or more wearable sensing devices.

12. The method of claim 10, wherein the reaction data recorded by the one or more wearable sensing devices include data of one or more of finger movement, hand movement, arm movement, head movement, eye movement, torso movement, hip movement, leg movement, or vocal pitch.

13. One or more non-transitory computer-readable media having a plurality of instructions stored thereon, wherein the plurality of instructions, in response to execution by a processor of an apparatus, cause the apparatus to:
    transmit a request to a remote data source, wherein the request includes context data indicative of an operational context of the apparatus and data associated with the apparatus that identifies one or more capabilities of the apparatus;
    receive, in response to the request, reaction data to be utilized in reacting to the operational context, wherein the reaction data is derived from previous observations of responses of a plurality of humans to a context similar to the operational context indicated by the context data of the request and wherein the reaction data received is based, at least in part, on the capability data; and
    cause the apparatus to carry out one or more actions based at least on the reaction data and the operational context.

14. The one or more non-transitory computer-readable media of claim 13, wherein the reaction data includes data concerning one or more actions associated with the previously observed human responses, and wherein the plurality of instructions, when executed by the processor, further cause the apparatus to carry out the one or more actions.

15. The one or more non-transitory computer-readable media of claim 14, wherein at least a portion of the reaction data is previously recorded by one or more wearable sensing devices worn by a human.

16. The one or more non-transitory computer-readable media of claim 15, wherein the one or more actions include movements of the plurality of humans recorded by the one or more wearable sensing devices.

17. The one or more non-transitory computer-readable media of claim 15, wherein the reaction data recorded by the one or more wearable sensing devices include data of one or more of finger movement, hand movement, arm movement, head movement, eye movement, torso movement, hip movement, leg movement, or vocal pitch.

18. A system comprising:
    one or more wearable sensing devices to be worn by a plurality of humans to observe human responses and to generate sensing data representative of the human responses; and
    a server communicatively coupled with the sensing devices that includes:
        a storage device to store a plurality of reaction records, wherein each of the plurality of reaction records contains reaction data derived from the generated sensing data of the plurality of observed human responses from the plurality of humans, the responses correlated with a context; and
        a reaction engine, coupled with the storage device, to provide reaction data of one or more of the plurality of reaction records, in response to a request from a remote apparatus that contains context data indicative of an operational context of the remote apparatus and one or more capabilities of the remote apparatus to enable the remote apparatus to mimic human response.

19. The system of claim 18, wherein to provide reaction data further comprises:
    identification of one or more reaction records of the plurality of reaction records, correlated with a context similar to the context data contained within the request; and
    transmission, to the remote apparatus, of reaction data contained within the one or more reaction records.

20. The system of claim 18, wherein the reaction engine is further to:
    receive, from the one or more wearable sensing devices, new reaction data indicative of a new human response associated with a context in which the new human response occurred; and
    add the new reaction data to the reaction records to enable provision of the new reaction data in response to a request for reaction data containing context data similar to the context associated with the new reaction data.

21. The system of claim 20, wherein to add the new reaction data to the reaction records is to normalize the new reaction data with reaction data contained within the reaction records.

22. The system of claim 18, wherein to mimic human response is to carry out one or more actions that include movements of the human recorded by the one or more wearable sensing devices.

23. The system of claim 22, wherein the reaction data recorded by the one or more wearable sensing devices include data of one or more of finger movement, hand movement, arm movement, head movement, eye movement, torso movement, hip movement, leg movement, or vocal pitch.

\* \* \* \* \*